(12) United States Patent
Foerster et al.

(10) Patent No.: US 12,728,695 B2
(45) Date of Patent: Sep. 8, 2026

(54) HEAT EXCHANGER

(71) Applicant: MAHLE International GmbH, Stuttgart (DE)

(72) Inventors: Uwe Foerster, Erdmannhausen (DE); Hannes Stadler, Ludwigsburg (DE); Hrushikesh Swami, Pandharpir (IN)

(73) Assignee: Mahle International GmbH, Stuttgart (DE)

(*) Notice: Subject to any disclaimer, the term of this patent is extended or adjusted under 35 U.S.C. 154(b) by 253 days.

(21) Appl. No.: 18/510,017

(22) Filed: Nov. 15, 2023

(65) Prior Publication Data

US 2024/0157755 A1 May 16, 2024

(30) Foreign Application Priority Data

Nov. 15, 2022 (DE) ..................... 10 2022 212 155.4

(51) Int. Cl.
*B60H 1/00* (2006.01)

(52) U.S. Cl.
CPC ..... *B60H 1/00328* (2013.01); *B60H 1/00907* (2013.01)

(58) Field of Classification Search
CPC ........................ B60H 1/00328; B60H 1/00907
See application file for complete search history.

(56) References Cited

U.S. PATENT DOCUMENTS 9,862,251 B2 1/2018 Brodie et al.
11,117,441 B2 9/2021 Kozasa

FOREIGN PATENT DOCUMENTS

DE 102014112343 A1 3/2015
DE 112017005777 T5 8/2019

*Primary Examiner* — Jonathan Bradford

(74) *Attorney, Agent, or Firm* — Muncy, Geissler, Olds & Lowe, P.C.

(57) ABSTRACT

A heat exchanger having a first heat transfer area, a second heat transfer area, a fluid collector and a valve unit as a single unit. The first heat transfer area has a first fluid path and a second fluid path. The first fluid path is in thermal contact with the second fluid path. The second heat transfer path has a third fluid path and a fourth fluid path. The third fluid path is in thermal contact with the fourth fluid path. The fluid collector has a first fluid inlet and a first fluid outlet for inflow into the fluid collector for storage in the fluid collector and for outflow from the fluid collector. The valve unit controls the fluid flow through the first heat transfer area, the second heat transfer area and/or the fluid collector in at least one first operating state for air conditioning cycle operation and/or in at least one second operating state for heat pump circuit operation.

15 Claims, 6 Drawing Sheets

1
2
3
4
5
6
7
8
9
10
11
12
13
14
15
16
17
18
19

210
211
201
202
203
205
204

HEAT EXCHANGER

This nonprovisional application claims priority under 35 U.S.C. § 119(a) to German Patent Application No. 10 2022 212 155.4, which was filed in Germany on Nov. 15, 2022, and which is herein incorporated by reference.

BACKGROUND OF THE INVENTION

Field of the Invention

The invention relates to a heat exchanger, in particular an external heat exchanger of a refrigerant circuit, which can be effectively operated in both an air conditioning operation and a heat pump operation, in particular of a motor vehicle.

Description of the Background Art

In motor vehicles, a refrigerant circuit is known, which is operated as an air conditioning cycle, in which a condenser is provided as an external heat exchanger, which is operated for desuperheating, condensing and subcooling the refrigerant, wherein the condenser has a first desuperheating and condensation area and a second subcooling area, wherein a collector with drying and filter function is interposed between the first desuperheating and condensation area and the second subcooling area, in which a defined storage of refrigerant and also a phase separation of vaporous refrigerant and liquid refrigerant take place in order to operate the subsequent subcooling in the subcooling area as far as possible only with liquid refrigerant, which has advantages for the subcooling of the refrigerant.

In motor vehicles, a refrigerant circuit is also known, which is operated as a heat pump circuit, which has an evaporator as an external heat exchanger, which has only one evaporation area. Such external heat exchangers, which are intended as evaporators, do not have a subcooling area and there is no provision for a collector that is interposed between two areas of the external heat exchanger.

If a refrigerant circuit is used both as an air conditioning cycle and as a heat pump circuit, an external heat exchanger, which is designed as a condenser, is less effective in the heat pump circuit because the collector and the subcooling section can have interfering influences. Also, an external heat exchanger, which is designed as an evaporator, is not very effective in the air conditioning cycle because the collector and the subcooling section are missing in the function of a condenser.

SUMMARY OF THE INVENTION

It is therefore an object of the invention to provide a heat exchanger that can be used effectively as an external heat exchanger in both an air conditioning cycle and a heat pump circuit.

An exemplary embodiment of the invention relates to a heat exchanger with a first heat transfer area, with a second heat transfer area, with a fluid collector and with a valve unit as a single unit, wherein the first heat transfer area has a first fluid path for the first fluid to flow through and a second fluid path for a second fluid to flow through, wherein the first fluid path is in thermal contact with the second fluid path for the heat transfer between the first fluid and the second fluid, wherein the second heat transfer path has a third fluid path for the first fluid to flow through and a fourth fluid path for the second fluid to flow through, wherein the third fluid path is in thermal contact with the fourth fluid path for heat transfer between the first fluid and the second fluid, wherein the fluid collector has at least a first fluid inlet and at least a first fluid outlet for the inflow of the first fluid into the fluid collector, for the storage of the first fluid in the fluid collector and for the outflow of the first fluid from the fluid collector, wherein the valve unit is provided and designed to control the fluid flow of the first heat transfer area, the second heat transfer area and/or the fluid collector in at least one first operating state for air conditioning cycle operation and/or at least in a second operating state for heat pump circuit operation. As a result, the heat exchanger can be used in both air conditioning cycle operation and heat pump circuit operation without loss of effectiveness, wherein the valve unit adapts and changes the fluid flow of the first fluid, especially the refrigerant, to the requirements. Therefore, it is also easy to switch between the operating states and adjust the fluid flow accordingly.

The fluid collector can be designed with a valve unit as a single unit. This can be understood as meaning, for example, that the fluid collector and the valve unit are designed to be one-piece together or that they are manufactured separately from each other and connected to each other, so that they form a pre-assembled unit. For example, the valve unit can be flanged to the fluid collector or otherwise connected to it, for example soldered, glued or welded. The connection between the valve unit and the fluid collector can be separable or inseparable.

The valve unit in the first operating state can connect the first fluid path of the first heat transfer area to the first fluid inlet of the fluid collector and connect the first fluid outlet of the fluid collector to the third fluid path. This ensures that the fluid collector is interconnected between the first heat transfer area and the second heat transfer area in the first operating state for the air conditioning cycle operation, so that the first fluid flows first through the first heat transfer area, then through the fluid collector and then through the second heat transfer area. The first heat transfer area is used for the desuperheating and condensation of the first fluid, in particular as a refrigerant, the fluid collector is used for the collection and phase separation of the vaporous first fluid and the liquid first fluid, and the second heat transfer area is used for the supercooling of the first fluid.

The valve unit can have a second fluid inlet for the inflow of the first fluid into a fifth fluid path of the valve unit, and the valve unit has a second fluid outlet for the outflow of the first fluid from the fifth fluid path of the valve unit. This allows for the first fluid to flow directly into the valve unit, for example via a flange connection or pipe connection, so that the first fluid is directed via the valve unit to the first heat transfer area and can flow into it.

The valve unit in the first operating state can connect the second fluid inlet via the fifth fluid path and the second fluid outlet to the first fluid path of the first heat transfer area. As a result, the second fluid inlet of the valve assembly is fluidly connected to the one fluid inlet of the first heat transfer area and the first fluid path of the first heat transfer area. The first fluid therefore flows from the second fluid inlet of the valve unit essentially directly through the valve unit and into the first fluid path of the first heat transfer area. This achieves an effective design without significant residual heating.

The valve unit can have a third fluid inlet for the inflow of the first fluid into a sixth fluid path of the valve unit and the valve unit has a third fluid outlet for the outflow of first fluid from the sixth fluid path of the valve unit. This also achieves a compact design.

The first fluid path of the first heat transfer area can be connected to the third fluid inlet of the valve unit in the first operating state, and the valve unit connects the sixth fluid path to the first fluid inlet of the fluid collector via the third fluid outlet. In this way, the fluid collector is effectively downstream of the first heat transfer area. The first fluid, which is completely or substantially completely liquefied, such as refrigerants in particular, can therefore be effectively fed into the fluid collector.

The valve unit can have a fourth fluid inlet for the inflow of first fluid into a seventh fluid path of the valve unit and the valve unit has a fourth fluid outlet for the outflow of first fluid from the seventh fluid path of the valve unit. This also achieves a compact design.

In the first operating state, the third fluid path of the second heat transfer area can be connected to the fourth fluid outlet of the valve unit and the valve unit connects the fluid collector to the third fluid path of the second heat transfer area via the fourth fluid inlet and the seventh fluid path. In this way, the fluid collector is effectively upstream of the second heat transfer area. The first fluid, which is essentially completely liquefied, such as refrigerant in particular, can therefore be effectively directed from the fluid collector to the second heat transfer area for supercooling.

The valve unit can have a fifth fluid inlet for the inflow of first fluid into an eighth fluid path of the valve unit and the valve unit has a fifth fluid outlet for the outflow of first fluid from the eighth fluid path of the valve unit.

In the first operating state, the third fluid path of the second heat transfer area can be connected to the fifth fluid inlet of the valve unit and the valve unit connects the third fluid path of the second heat transfer area via the eighth fluid path to the fifth fluid outlet of the valve unit for the outflow of the first fluid from the heat exchanger. In this way, it can be achieved that supercooled first fluid can effectively leave the heat exchanger without much residual heating.

Overall, it is advantageous that the heat exchanger with its first heat transfer area, with its second heat transfer area, with its fluid collector and with its valve unit is designed to be connected to each other in one piece, so that the heat exchanger as a whole is compact, the fluid paths can be designed short and effective, and there are few interfaces to the outside, which results in efficient fluid routing and fluid cooling.

The valve unit in the second operating state can be connected to the first fluid outlet of the fluid collector to the third fluid path of the second heat transfer area and connect the third fluid path of the second heat transfer area to the first fluid path of the first heat transfer area. This ensures that the first fluid first flows through the fluid collector, then passes through the valve unit to the second heat transfer area, and then the valve unit directs the first fluid from the second heat transfer area to the first heat transfer area. In the second operating state, the fluid collector is operated only as a collector and is upstream of the two heat transfer areas before the valve unit connects the second heat transfer area with the first heat transfer area and the first fluid flows through them one after the other. In the second operating state, i.e., in heat pump circuit operation, the second heat transfer area serves to sub cool the first fluid, i.e., as a subcooling section, and the first heat transfer area serves as an evaporator for the first fluid in the second operating state. For example, the valve unit directs the first fluid first to the fluid collector and then from the fluid collector to the two heat transfer areas.

In the second operating state, the valve unit can connect to the second fluid inlet with the first fluid inlet of the fluid collector. This means that the first fluid is fed into the valve unit via the second fluid inlet and then directed to the fluid collector. This results in a compact fluid flow and a compact design. Thus, there is a fluid path between the second fluid inlet of the valve unit and the first fluid inlet of the fluid collector.

In the second operating state, the third fluid path of the second heat transfer area can be connected to the fourth fluid outlet of the valve unit, and the valve unit connects the fluid collector to the third fluid path of the second heat transfer area via the fourth fluid inlet and the seventh fluid path. Thus, there is a fluid path between the fluid collector and the third fluid path of the second heat transfer area through the valve unit, which allows for a compact design and a compact fluid flow.

The valve unit can connect the third fluid path of the second heat transfer area via a fluid inlet, a fluid channel and a fluid outlet, which allows for a compact design and compact fluid routing.

The valve unit thus allows for a compact design and a switching of the fluid flow between the operating states.

The first heat transfer area can be located above or below the second heat transfer area. If, for example, the first heat transfer area is above the second heat transfer area, the area for supercooling the first fluid in the first operating state, such as the refrigerant, can be specifically arranged in the air flow as a second fluid, so that prior heating of the second fluid can be reduced or avoided if necessary. Depending on the design in the environment, the same can also be done with an arrangement in which the first heat transfer area is located below the second heat transfer area, for example.

The first fluid path of the first heat transfer area can be traversed by the first fluid from bottom to top or from top to bottom, and/or that the third fluid path of the second heat transfer area is traversed by the first fluid from bottom to top or top to bottom. As a result, the direction of flow can depend on the design and environment of the heat exchanger in order to achieve efficient cooling and flow control.

The first heat transfer area can be flowed through by the first fluid in a single or multi-flow manner and/or that the second heat transfer area is flowed through by the first fluid in a single or multi-flow manner. In the case of a single-flow flow through, the first fluid is directed through the heat transfer area in only one direction, whereas in a multi-flow design, the heat transfer area is passed through in several ways. For example, the second heat exchanger area can be flowed through by the first fluid in a single-flow or advantageous two-flow manner. The first heat exchanger area can also be flowed through by the first fluid, for example in a single-flow or two-, three-, four- or multi-flow manner.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The invention relates to a heat exchanger 1, 101, 201, which can be used in a refrigerant circuit to be operated in a first operating state for an air conditioning cycle operation and/or to be operated in at least a second operating state for heat pump circuit operation. The heat exchanger 1, 101, 201 is fluidically integrated into the refrigerant circuit, and can be operated as a condenser in air conditioning cycle operation as well as at least partially as an evaporator in heat pump circuit operation.

In the second operating state, i.e., in heat pump circuit operation, the second heat transfer area 3 is used for subcooling, and the first heat transfer area 2 serves as an evaporator for the first fluid.

Figure 1:
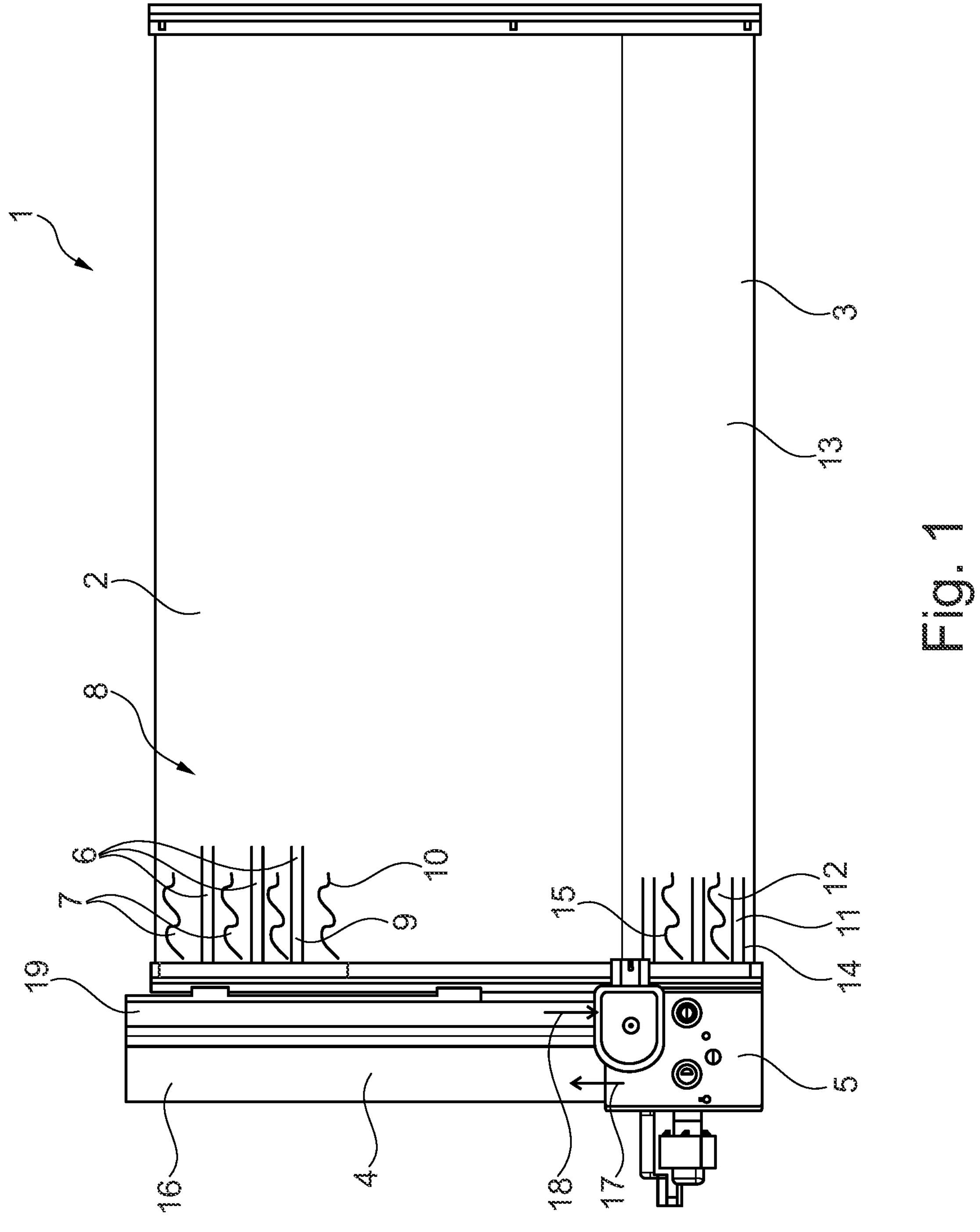
FIG. 1 shows a schematic representation of an example of a heat exchanger according to the invention.

FIG. 1 shows a heat exchanger 1 of an example with a first heat transfer area 2 and with a second heat transfer area 3. Furthermore, a fluid collector 4 and a valve unit 5 are provided, which are designed together as a single unit.

The first heat transfer area 2 has a first fluid path 6 for a first fluid to flow through and a second fluid path 7 for a second fluid to flow through. For example, the first heat transfer area 2 is formed as fin-tube block 8 with tubes 9 and fins 10, wherein the tubes 9 form the first fluid path 6 and the fins 10 between the tubes 9 form the second fluid path 7.

Alternatively, the first heat transfer area 2 can also be designed in other ways, for example in stacking disc design, wherein first and second fluid paths 6, 7 are arranged between stacking discs and preferably arranged alternately.

For heat transfer between the first fluid and the second fluid, the first fluid path 6 and the second fluid path 7 are in thermal contact, in such a way that the first fluid flowing through the first fluid path 6 exchanges heat with the second fluid, which flows through the second fluid path 7. There is a transfer of heat from the first fluid to the second fluid or from the second fluid to the first fluid, depending on the temperature of the two fluids.

The first fluid is, for example, a refrigerant, in particular R1234yf, R134a, R744 or any other refrigerant, in particular a refrigerant with a liquid-vapor phase transition. The second fluid is a fluid for temperature control, such as air, water or a water mixture, etc. This basically applies to all the examples described, without the need for further mention.

Furthermore, the second heat transfer area 3 has a third fluid path 11 for the first fluid to flow through and a fourth fluid path 12 for the second fluid to flow through. The third fluid path 11 is in thermal contact with the fourth fluid path 12 for heat transfer between the first fluid and the second fluid.

For example, the second heat transfer area 3 is formed as fin-tube block 13 with tubes 14 and fins 15, wherein the tubes 14 form the third fluid path 11 and the fins 15 between the tubes 14 form the fourth fluid path 12.

Alternatively, the second heat transfer area 3 can also be designed in other ways, for example in stacking disc design, wherein third and fourth fluid paths 11,12 are arranged between stacking discs and preferably arranged alternately.

Furthermore, the fluid collector 4 is designed as a collection volume with a fluid collector housing 16 with a first fluid inlet 17 and with a first fluid outlet 18, as they are only schematically shown in FIG. 1.

The first fluid inlet 17 is used for the inflow of the first fluid into the fluid collector 4, in particular for the storage of the first fluid in the fluid collector 4 and the first fluid outlet 18 is used for the outflow of the first fluid from the fluid collector 4. Depending on the operating state, the fluid collector 4 can be used not only to store a defined amount of first fluid but also to phase separate the liquid first fluid and the vaporous first fluid, in particular if the first fluid is a refrigerant. For example, a filter and/or dryer could also be used in the fluid collector 4 to filter and/or dry the first fluid.

The valve unit 5 of the heat exchanger 1 is provided and designed to control the fluid flow through the first heat transfer area 2, the second heat transfer area 3 and/or the fluid collector 4 in at least one first operating state for the air conditioning cycle operation and/or at least a second operating state for heat pump circuit operation.

For this purpose, the valve unit has 5 different fluid inlets, fluid outlets, fluid paths and valve elements, wherein the valve elements control the interconnection of the first heat transfer area 2, the second heat transfer area 3 and/or the fluid collector 4 to each other, so that, depending on the operating state, a different interconnection result and thus a different flow through the first heat transfer area 2, the second heat transfer area 3 and/or the fluid collector 4.

In the example of FIG. 1, the heat exchanger 1 is shown in a frontal representation, which shows that the first heat transfer area 2 is located above the second heat transfer area 3. The fluid collector 4 is located on the sides of the two heat transfer areas 2, 3. The valve unit 5 is located at the level of the second heat transfer area 3 below the fluid collector 4.

In the example of FIG. 1, the heat exchanger 1 is designed in such a way that the first fluid path 6 of the first heat transfer area 2 is flowed through by the first fluid from bottom to top and then flows back to the valve unit through a riser tube 19 and/or that the third fluid path 11 of the second heat transfer area 3 is flowed through by the first fluid from bottom to top or from top to bottom.

In this case, the first heat transfer area 2 is flowed through by the first fluid in a single-flow or preferably multi-flow manner and/or the second heat transfer area 3 is flowed through by the first fluid in a single-flow or multi-flow manner. In the example of FIG. 1, the first heat transfer area 2 is flowed through in a multi-flow manner and the second heat transfer area 3 is also flowed through in a multi-flow manner. The first fluid flows from the valve unit 5 through the respective heat transfer area 2, 3 and then back to the valve unit 5.

Figure 2:
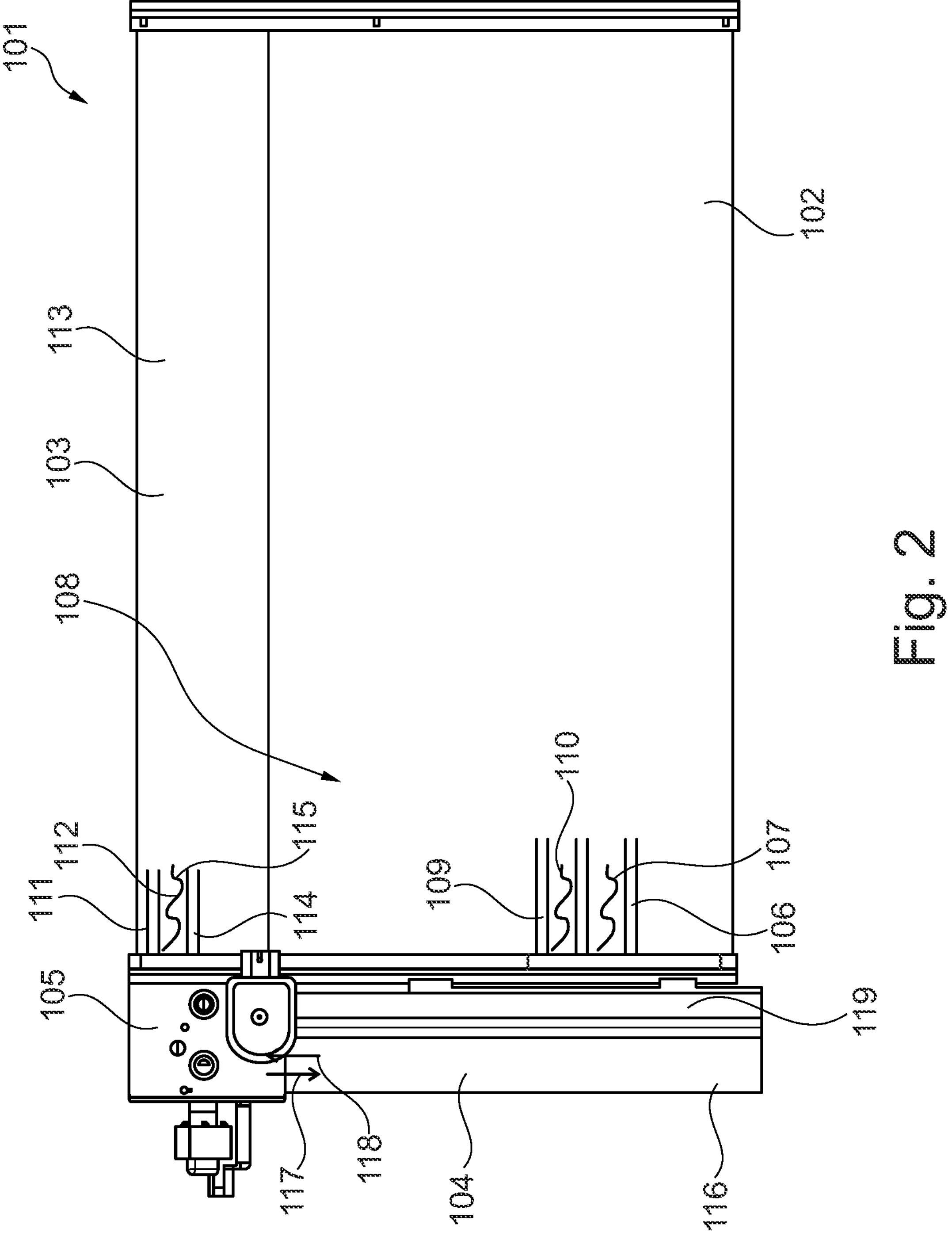
FIG. 2 shows a schematic representation of an example of a heat exchanger according to the invention.

FIG. 2 shows a second example of a heat exchanger 101 with a first heat transfer area 102 and with a second heat transfer area 103. Furthermore, a fluid collector 104 and a valve unit 105 are provided, which together are designed as a single unit.

The first heat transfer area 102 has a first fluid path 106 for a first fluid to flow through and a second fluid path 107 for a second fluid to flow through. For example, the first heat transfer area 102 is formed as fin-tube block 108 with tubes 109 and fins 110, with tubes 109 forming the first fluid path 106 and the fins 110 between tubes 109 forming the second fluid path 107.

Alternatively, the first heat transfer area 102 can also be designed in other ways, for example in stacking disc design, wherein first and second fluid paths 106, 107 are arranged between stacking discs and preferably arranged alternately.

For heat transfer between the first fluid and the second fluid, the first fluid path 106 and the second fluid path 107 are in thermal contact, in such a way that the first fluid flowing through the first fluid path 106 exchanges heat with the second fluid, which flows through the second fluid path 107. There is a transfer of heat from the first fluid to the second fluid or from the second fluid to the first fluid, depending on the temperature of the two fluids.

Also, the second heat transfer area 103 has a third fluid path 111 for the first fluid to flow through and a fourth fluid path 112 for the second fluid to flow through. The third fluid path 111 is in thermal contact with the fourth fluid path 112 for heat transfer between the first fluid and the second fluid.

For example, the second heat transfer area 103 is formed as fin-tube block 113 with tubes 114 and fins 115, wherein the tubes 114 form the third fluid path 111 and the fins 115 between the tubes 114 form the fourth fluid path 112.

As an example, the fin-tube block 108 of the first heat transfer area 102 is designed in one piece with the fin-tube block 113 of the second heat transfer area 103. Alternatively, the fin-tube block 108 of the first heat transfer area 102 can also be designed independently of the fin-tube block 113 of the second heat transfer area 103. In principle, these options also apply to the other examples described.

Alternatively, the second heat transfer area 103 can also be designed in other ways, for example in stacking disc design, wherein third and fourth fluid paths 111,112 are arranged between stacking discs and preferably arranged alternately. For example, the stacking disc block of the first heat transfer area 102 can be designed in one piece with the stacking disc block of the second heat transfer area 103. Alternatively, the stacking disc block of the first heat transfer area 102 can also be designed independently of the stacking disc block of the second heat transfer area 103. In principle, these options also apply to the other examples described.

The fluid collector 104 is designed as a collection volume with a fluid collector housing 116 with a first fluid inlet 117 and with a first fluid outlet 118, as shown only schematically in FIG. 2.

The first fluid inlet 117 is used for the inflow of the first fluid into the fluid collector 104, in particular for the storage of the first fluid in the fluid collector 104 and the first fluid outlet 118 is used for the outflow of the first fluid from the fluid collector 104. Depending on the operating state, the fluid collector 104 can be used not only to store a defined amount of first fluid but also to phase separate the liquid first fluid and the vaporous first fluid, in particular if the first fluid is a refrigerant. For example, a filter and/or dryer could also be used in the fluid collector 104 for filtering and/or drying the first fluid.

The valve unit 105 of the heat exchanger 101 is provided and designed to control the fluid flow of the first heat transfer area 102, the second heat transfer area 103 and/or the fluid collector 104 in at least a first operating state for an air conditioning cycle operation and/or in at least a second operating state for heat pump circuit operation.

For this purpose, the valve unit 105 has different fluid inlets, fluid outlets, fluid paths and valve elements, wherein the valve elements control the interconnection of the first heat transfer area 102, the second heat transfer area 103 and/or the fluid collector 104 to each other, so that, depending on the operating state, a different interconnection result and thus a different flow through the first heat transfer area 102, the second heat transfer area 103 and/or the fluid collector 104.

In the example of FIG. 2, the heat exchanger 101 is shown in a frontal representation, which shows that the first heat transfer area 102 is located below the second heat transfer area 103. The fluid collector 104 is located on the sides of the two heat transfer areas 102, 103. The valve unit 105 is located at the level of the second heat transfer area 103 above the fluid collector 104.

In the example of FIG. 2, the heat exchanger 101 is designed in such a way that the first fluid path 106 of the first heat transfer area 102 is flowed through by the first fluid from top to bottom and then flows back to the valve unit through a downpipe 119 and/or that the third fluid path 111 of the second heat transfer area 103 is flowed through by the first fluid from bottom to top or from top to bottom.

In this case, the first heat transfer area 102 is flowed through by the first fluid in a single-flow or preferably multi-flow manner and/or the second heat transfer area 103 is flowed through by the first fluid in a single-flow or multi-flow manner. In the example of FIG. 2, the first heat transfer area 102 is flowed through in a multi-flow manner and the second heat transfer area 103 is also flowed through in a multi-flow manner. The first fluid flows from the valve unit 105 through the respective heat transfer area 102, 103 and then back to the valve unit 105.

Figure 3:
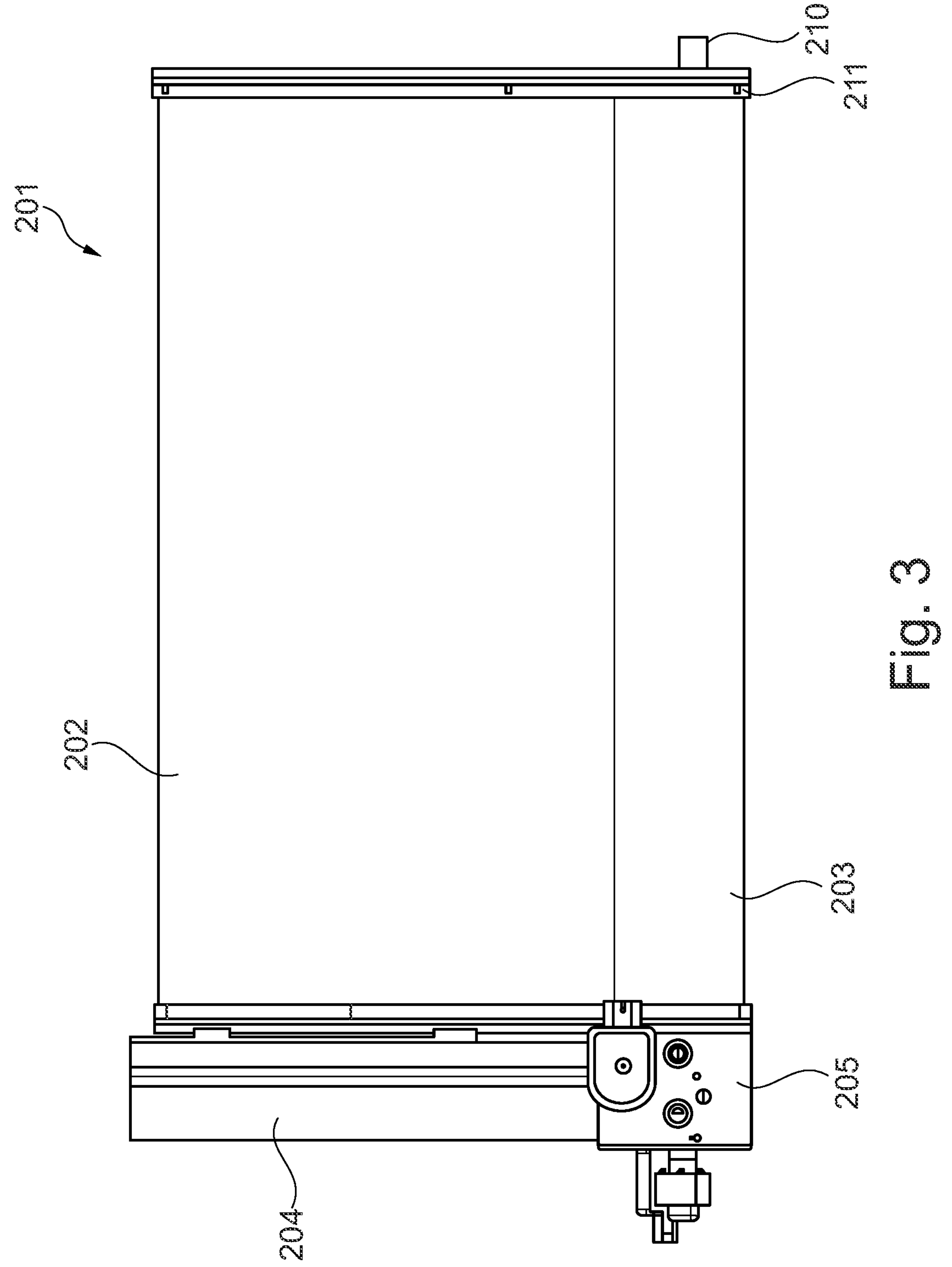
FIG. 3 shows a schematic representation of an example of a heat exchanger according to the invention.

FIG. 3 shows an example of a heat exchanger 201, in which the heat exchanger 201 is essentially the same as in the example of FIG. 1, with a first heat transfer area 202 and a second heat transfer area 203. Furthermore, a fluid collector 204 and a valve unit 205 are planned, which are designed together as a single unit. In this regard, reference is made to the detailed description of the heat exchanger 1 in FIG. 1. However, the second heat transfer area 203 is single-flow or odd-numbered flow, so that the fluid outlet 210 is not formed on the valve unit 205, but on the side of the heat exchanger 201 opposite the valve unit 205, in particular on a manifold 211.

Figure 4:
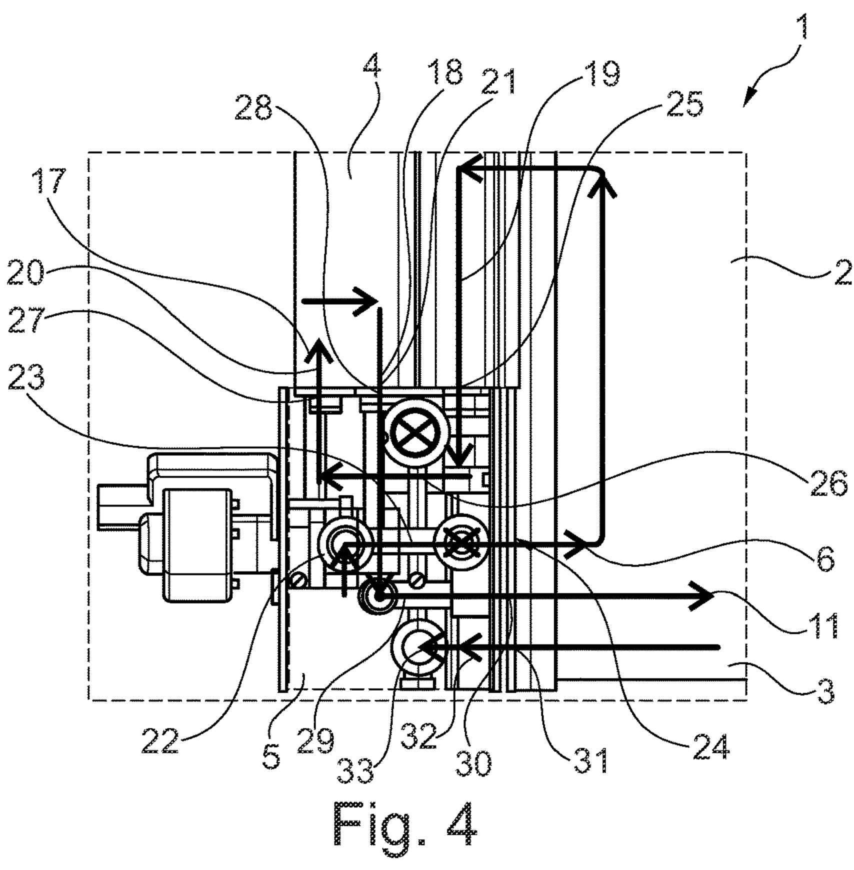
FIG. 4 shows a schematic representation of an interconnection of an example of the valve unit in a first operating state in air conditioning cycle operation.
Figure 5:
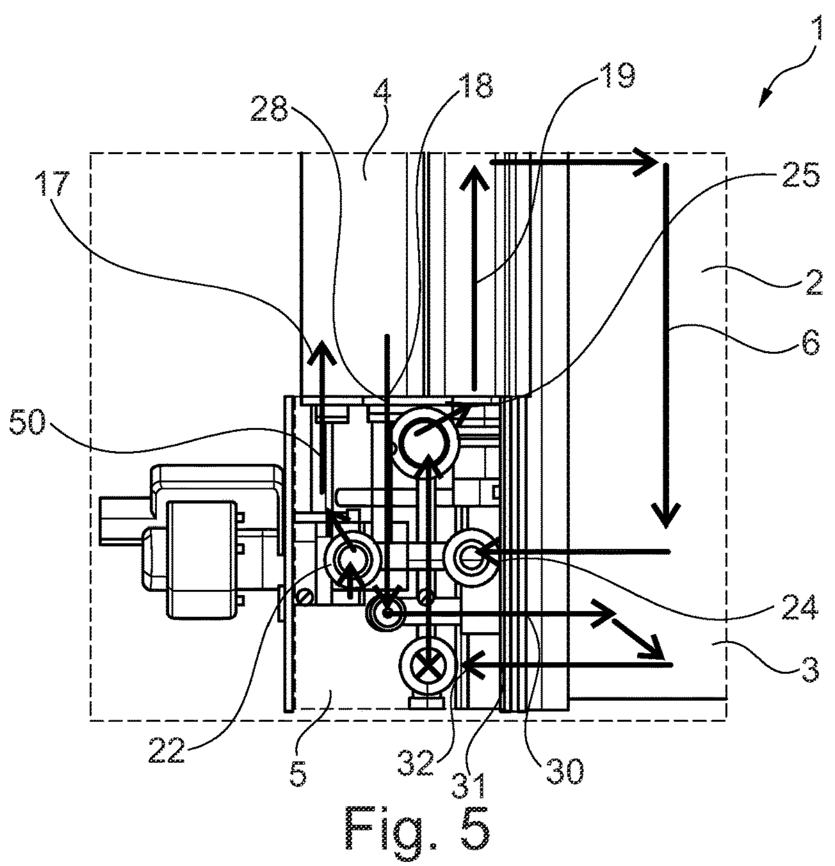
FIG. 5 shows a schematic representation of an interconnection of the valve unit according to FIG. 4 in a second operating state in heat pump cycle operation.

FIG. 4 shows a schematic representation of an interconnection of an example of a valve unit 5 in a first operating state in air conditioning cycle operation, whereas FIG. 5 shows a schematic representation of an interconnection of the valve unit 5 according to FIG. 4 in a second operating state in heat pump circuit operation.

It can be seen from FIG. 4 that in the first operating state, the valve unit 5 connects the first fluid path 6 of the first heat transfer area 2 to the first fluid inlet 20 of the fluid collector 4 and connects the first fluid outlet 21 of the fluid collector 4 to the third fluid path 11. Accordingly, the valve unit 5 is interconnected between the first fluid path 6 of the first heat transfer area 2 and the third fluid path 11 of the second heat transfer area 3 in order to connect the collector 4 in between.

The valve unit 5 has a second fluid inlet 22 for the inflow of the first fluid into a fifth fluid path 23 of the valve unit 5 and the valve unit 5 has a second fluid outlet 24 for the outflow of first fluid from the fifth fluid path 23 of the valve unit 5. In the first operating state, the valve unit 5 connects the second fluid inlet 22 via the fifth fluid path 23 and the second fluid outlet 24 to the first fluid path 6 of the first heat transfer area 2. Thus, first fluid can flow into the valve unit 5 via the second fluid inlet 22, via the valve unit 5 through the fifth fluid path 23 and flow through the second fluid outlet 24 to the first fluid path 6. After that, the first fluid flows through the first fluid path 6.

Furthermore, the valve unit 5 has a third fluid inlet 25 for the inflow of first fluid into a sixth fluid path 26 of the valve unit 5 and the valve unit 5 has a third fluid outlet 27 for the outflow of first fluid from the sixth fluid path 26 of the valve unit 5. In the first operating state, the first fluid path 6 of the first heat transfer area 2 is connected to the third fluid inlet 25 of the valve unit 5 and the valve unit 5 connects the sixth fluid path 26 via the third fluid outlet 27 to the first fluid inlet 20 of the fluid collector 4. Thus, the first fluid path 6 of the first heat transfer area 2 is connected to the fluid collector 4.

Furthermore, the valve unit 5 has a fourth fluid inlet 28 for the inflow of first fluid into a seventh fluid path 29 of the valve unit 5 and the valve unit 5 has a fourth fluid outlet 30 for the outflow of first fluid from the seventh fluid path 29 of the valve unit 5. In the first operating state, the third fluid path 11 of the second heat transfer area 3 is connected to the fourth fluid outlet 30 of the valve unit 5 and the valve unit 5 connects the fluid collector 4 to the third fluid path 11 of the second heat transfer area 3 via the fourth fluid inlet 28 and the seventh fluid path 29.

Furthermore, the valve unit 5 has a fifth fluid inlet 31 for the inflow of first fluid into an eighth fluid path 32 of the valve unit 5 and the valve unit 5 has a fifth fluid outlet 33 for the outflow of first fluid from the eighth fluid path 32 of the valve unit 5. In the first operating state, the third fluid path 11 of the second heat transfer area 3 is connected to the fifth fluid inlet 31 of the valve unit 5 and the valve unit 5 connects the third fluid path 11 of the second heat transfer area 3 via the eighth fluid path 32 with the fifth fluid outlet 33 of the valve unit 5 for the outflow of the first fluid from the heat exchanger 1.

Overall, the first fluid flows into the valve unit 5 at the second fluid inlet 22 of the valve unit 5, then flows through the first fluid path of the first heat transfer area 2, the fluid collector 4 and the third fluid path 11 of the second heat transfer area 3, and then leaves the heat exchanger 1 at the valve unit 5 at the fifth fluid outlet 33, wherein the valve unit 5 is flowed through a total of several times. The fluid collector 4 is thus interconnected between the first heat transfer area 2 and the second heat transfer area 3 in the fluid flow of the first fluid.

The heat exchanger 1 serves as a condenser, wherein the first heat transfer area 2 serves as the desuperheating and condensation area and the second heat transfer area 3 as the subcooling area for the first fluid.

For example, the first heat transfer area 2 is flowed through from bottom to top and the second heat transfer area 3 from top to bottom, for example. If necessary, this can also be reversed, so that the first heat transfer area 2 is flowed through from top to bottom, for example, and/or the second heat transfer area 3 is flowed through from bottom to top, for example.

It can be seen from FIG. 5 that in the second operating state, the valve unit 5 connects the first fluid outlet 18 of the fluid collector 4 to the third fluid path 11 of the second heat transfer area 3 and connects the third fluid path 11 of the second heat transfer area 3 to the first fluid path 6 of the first heat transfer area 2.

FIG. 5 also shows that in the second operating state, the valve unit 5 connects the second fluid inlet 22 with the first fluid inlet 17 of the fluid collector 4 via a fluid path. As a result, the first fluid flowing into the heat exchanger 1 and thus also into the valve unit 5 at the second fluid inlet 22 can be directed directly to the fluid collector 4 and its first fluid inlet 17. Subsequently, the first fluid flows through the fluid collector 4 and flows out of the fluid collector 4 at the first fluid outlet 18.

Furthermore, it can be seen from FIG. 5 that in the second operating state, the third fluid path 11 of the second heat transfer area 3 is connected to the fourth fluid outlet 30 of the valve unit 5 and the valve unit 5 connects the fluid collector 4 to the third fluid path 11 of the second heat transfer area 3 via the fourth fluid inlet 28 and the seventh fluid path 29. As a result, the first fluid flows out of the fluid collector 4 via a fluid path of the valve unit 5 to the third fluid path 11 of the second heat transfer area 3. The first fluid then flows through this third fluid path 11 of the second heat transfer area 3.

Furthermore, it can also be seen that the valve unit 5 connects the third fluid path 11 of the second heat transfer area 3 to the first fluid path 6 of the first heat transfer area 2 via a fluid inlet 31, a fluid path 32 and a fluid outlet 25. After that, the first fluid path 6 of the first heat transfer area 2 is flowed through before the first fluid flows into the valve unit 5 at the fluid inlet 24, flows through a fluid path and flows out of the valve unit 5 at the fluid outlet 40.

As a result, the third fluid path 11 of the second heat transfer area 3 is serially connected to the first fluid path 6 of the first heat transfer area 2, through which they flow successively and thus form a kind of common heat transfer area.

In this second operating state, the second heat transfer area 3 is flowed through from top to bottom, and the first heat transfer area 2 is also flowed through from top to bottom. Thus, the first fluid path 6 of the first heat transfer area 2 is flowed through by the first fluid from top to bottom, and the third fluid path 11 of the second heat transfer area 3 is also flowed through by the first fluid from top to bottom.

The first heat transfer area 2 is still located above the second heat transfer area 3.

The heat exchanger 1 serves as an evaporator. The fluid collector 4 is upstream of the heat transfer area 2, 3 as a whole, which serves as an evaporator.

Figures 6, 7:
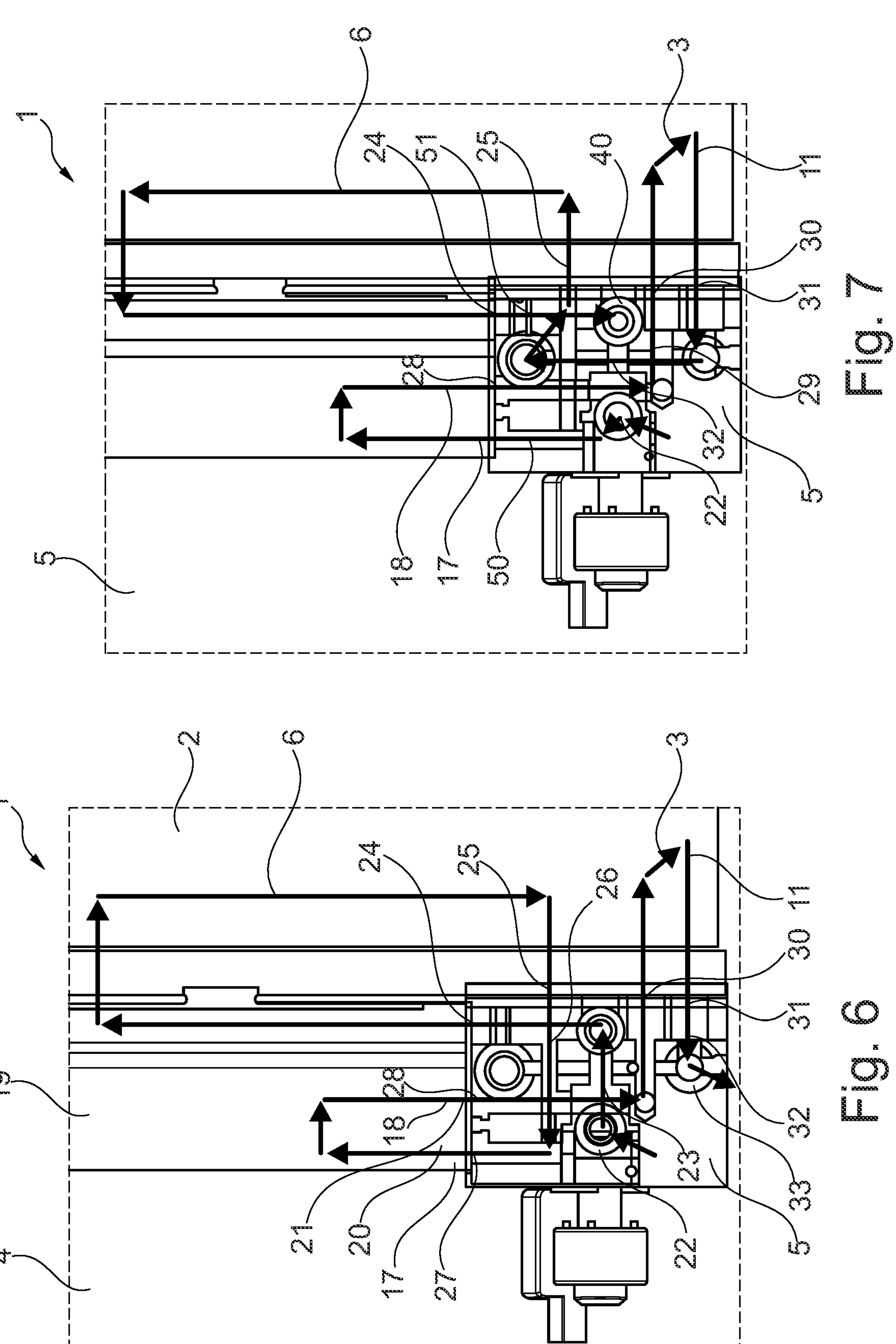
FIG. 6 shows a schematic representation of an interconnection of an example of a valve unit in a first operating state in air conditioning cycle operation.
FIG. 7 shows a schematic representation of an interconnection of the valve unit according to FIG. 6 in a second operating state in heat pump cycle operation.

FIG. 6 shows a schematic representation of an interconnection of another example of a valve unit 5 in a first operating state in air conditioning cycle operation.

It can be seen from FIG. 6 that in the first operating state, the valve unit 5 connects the first fluid path 6 of the first heat transfer area 2 to the first fluid inlet 20 of the fluid collector 4 and connects the first fluid outlet 21 of the fluid collector 4 to the third fluid path 11. Accordingly, the valve unit 5 is interconnected between the first fluid path 6 of the first heat transfer area 2 and the third fluid path 11 of the second heat transfer area 3 in order to fluidically connect the collector 4 in between.

The valve unit 5 has a second fluid inlet 22 for the inflow of the first fluid into a fifth fluid path 23 of the valve unit 5 and the valve unit 5 has a second fluid outlet 24 for the outflow of first fluid from the fifth fluid path 23 of the valve unit 5. In the first operating state, the valve unit 5 connects the second fluid inlet 22 via the fifth fluid path 23 and the second fluid outlet 24 to the first fluid path 6 of the first heat transfer area 2. Between the second fluid outlet 24 and the first fluid path 6, the riser tube 19 and the riser duct 19 are connected.

Thus, the first fluid can flow into the valve unit 5 at the second fluid inlet 22, and flow through the fifth fluid path 23 and flow through the second fluid outlet 24 via the riser tube 19 to the first fluid path 6. After that, the first fluid flows through the first fluid path 6 of the first heat transfer area 2.

Furthermore, the valve unit 5 has a third fluid inlet 25 for the inflow of first fluid into a sixth fluid path 26 of the valve unit 5 and the valve unit 5 has a third fluid outlet 27 for the outflow of first fluid from the sixth fluid path 26 of the valve unit 5. In the first operating state, the first fluid path 6 of the first heat transfer area 2 is connected to the third fluid inlet 25 of the valve unit 5 and the valve unit 5 connects the sixth fluid path 26 via the third fluid outlet 27 to the first fluid inlet 20 of the fluid collector 4. Thus, the first fluid path 6 of the first heat transfer area 2 is connected to the fluid collector 4.

Furthermore, the valve unit 5 has a fourth fluid inlet 28 for the inflow of first fluid into a seventh fluid path 29 of the valve unit 5 and the valve unit 5 has a fourth fluid outlet 30 for the outflow of first fluid from the seventh fluid path 29 of the valve unit 5. In the first operating state, the third fluid path 11 of the second heat transfer area 3 is connected to the fourth fluid outlet 30 of the valve unit 5 and the valve unit 5 connects the fluid collector 4 to the third fluid path 11 of the second heat transfer area 3 via the fourth fluid inlet 28 and the seventh fluid path 29.

Furthermore, the valve unit 5 has a fifth fluid inlet 31 for the inflow of first fluid into an eighth fluid path 32 of the valve unit 5 and the valve unit 5 has a fifth fluid outlet 33 for the outflow of first fluid from the eighth fluid path 32 of the valve unit 5. In the first operating state, the third fluid path 11 of the second heat transfer area 3 is connected to the fifth fluid inlet 31 of the valve unit 5 and the valve unit 5 connects the third fluid path 11 of the second heat transfer area 3 via the eighth fluid path 32 with the fifth fluid outlet 33 of the valve unit 5 for the outflow of the first fluid from the heat exchanger 1.

Overall, the first fluid flows into the valve unit 5 at the second fluid inlet 22 of the valve unit 5, then flows through the first fluid path 6 of the first heat transfer area 2, the fluid collector 4 and the third fluid path 11 of the second heat transfer area 3, and then leaves the heat exchanger 1 at the valve unit 5 at the fifth fluid outlet 33, wherein the valve unit 5 is flowed through a total of several times, i.e., four times. The fluid collector 4 is thus interconnected between the first heat transfer area 2 and the second heat transfer area 3 in the fluid flow of the first fluid.

The heat exchanger 1 serves as a condenser, wherein the first heat transfer area 2 serves as the desuperheating and condensation area and the second heat transfer area 3 as the subcooling area for the first fluid. The fluid collector is thus connected between the first heat transfer area 2, which serves as the desuperheating and condensation area, and the second heat transfer area 3, which serves as the subcooling area.

For example, the first heat transfer area 2 is flowed through from top to bottom and the second heat transfer area 3 from top to bottom, for example. If necessary, this can also be reversed, so that the first heat transfer area 2 is flowed through from top to bottom, for example, and/or the second heat transfer area 3 is flowed through from bottom to top, for example.

FIG. 7 shows a schematic representation of an interconnection of the valve unit 5 according to FIG. 6 in a second operating state in heat pump circuit operation.

It can be seen from FIG. 7 that in the second operating state, the valve unit 5 connects the first fluid outlet 18 of the fluid collector 4 to the third fluid path 11 of the second heat transfer area 3 and connects the third fluid path 11 of the second heat transfer area 3 to the first fluid path 6 of the first heat transfer area 2.

It can also be seen in FIG. 7 that in the second operating state, the valve unit 5 connects the second fluid inlet 22 with the first fluid inlet 17 of the fluid collector 4 via a fluid path 50. As a result, the first fluid flowing into the heat exchanger 1 and thus also into the valve unit 5 at the second fluid inlet 22 can be directed directly to the fluid collector 4 and its first fluid inlet 17. Subsequently, the first fluid flows through the fluid collector 4 and flows out of the fluid collector 4 at the first fluid outlet 18.

Furthermore, it can be seen from FIG. 5 that in the second operating state, the third fluid path 11 of the second heat transfer area 3 is connected to the fourth fluid outlet 30 of the valve unit 5 and the valve unit 5 connects the fluid collector 4 to the third fluid path 11 of the second heat transfer area 3 via the fourth fluid inlet 28 and the seventh fluid path 29. As a result, the first fluid flows out of the fluid collector 4 via the fluid path 29 of the valve unit 5 to the third fluid path 11 of the second heat transfer area 3. The first fluid then flows through this third fluid path 11 of the second heat transfer area 3.

Furthermore, it can also be seen that valve unit 5 connects the third fluid path 11 of the second heat transfer area 3 to the first fluid path 6 of the first heat transfer area 2 via a fluid inlet 31, a fluid path 32 and a fluid outlet 25. The first fluid path 6 of the first heat transfer area 2 is then flowed through before the first fluid flows into the valve unit 5 at the fluid inlet 24, flows through a fluid path 51 and flows out of the valve unit 5 and thus out of the heat exchanger 1 at the fluid outlet 40.

As a result, the third fluid path 11 of the second heat transfer area 3 is serially connected to the first fluid path 6 of the first heat transfer area 2, which are flowed through one after the other, thus forming a kind of common heat transfer area 2, 3.

In this second operating state, the second heat transfer area 3 is flowed through from top to bottom and the first heat transfer area 2 is flowed through from bottom to top. Thus, the first fluid path 6 of the first heat transfer area 2 is flowed through by the first fluid from bottom to top, and the third fluid path 11 of the second heat transfer area 3 is flowed through by the first fluid from top to bottom.

The first heat transfer area 2 is located above the second heat transfer area 3.

Figure 9:
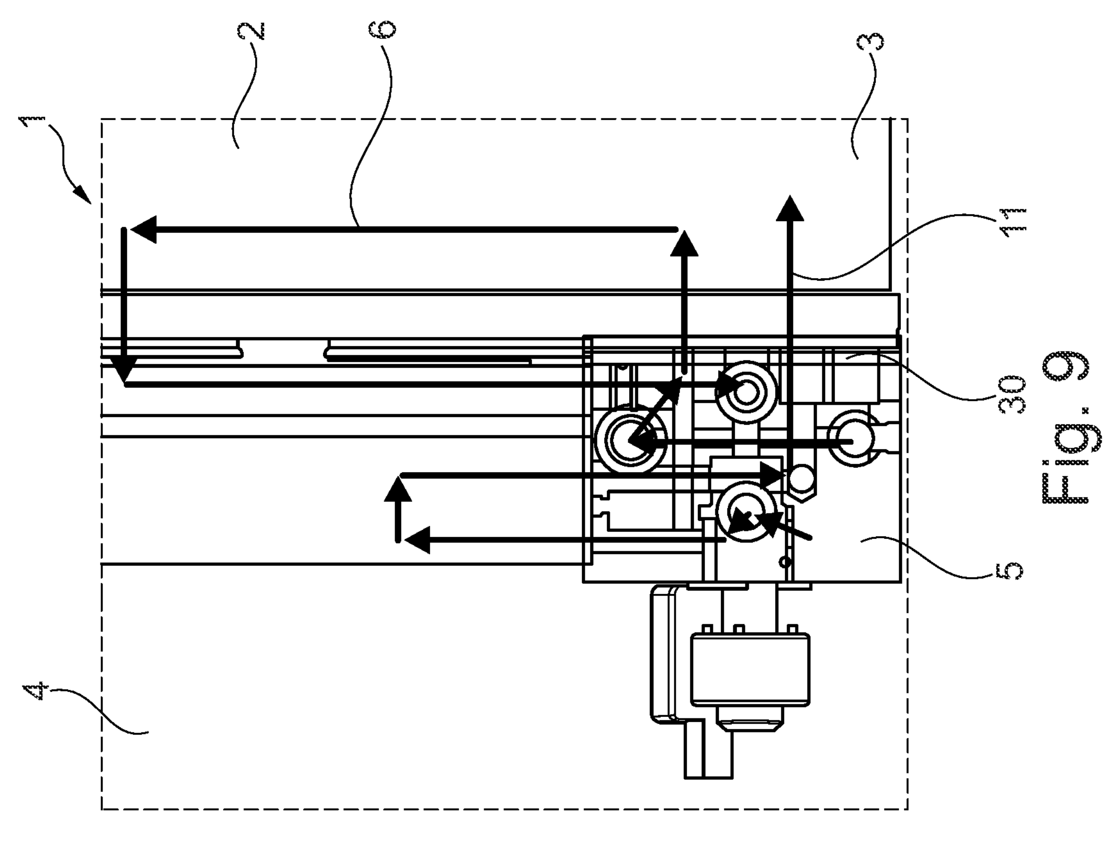
FIG. 9 shows a schematic representation of an interconnection of the valve unit according to FIG. 8 in a second operating state in heat pump cycle operation.
Figure 8:
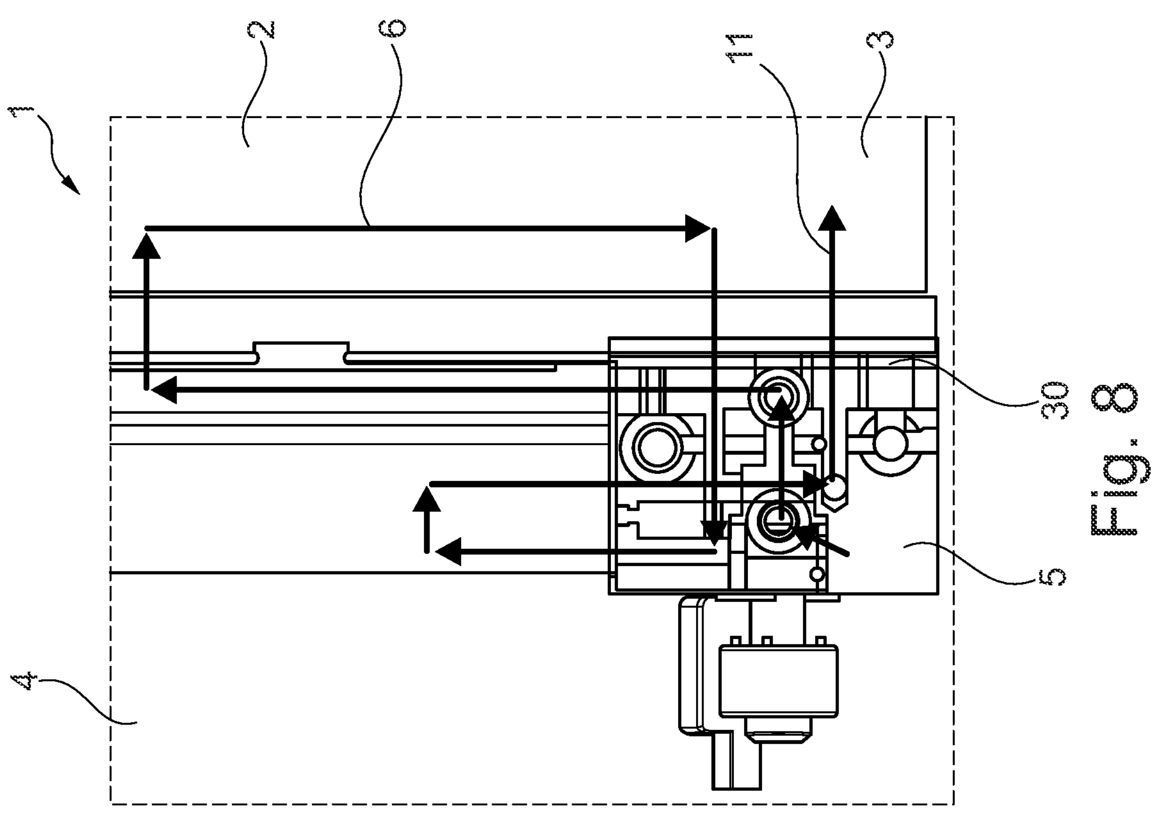
FIG. 8 shows a schematic representation of an interconnection of an example of a valve unit in a first operating state in air conditioning cycle operation.

FIG. 8 shows a schematic representation of an interconnection of another example of a valve unit 5 in a first operating state in air conditioning cycle operation. FIG. 9 shows a schematic representation of an interconnection of the valve unit 5 according to FIG. 8 in a second operating state in heat pump circuit operation.

The example of FIG. 8 essentially corresponds to the example of FIG. 6 and the example of FIG. 9 essentially corresponds to the example of FIG. 7, wherein instead of a two-flow flow through the second heat transfer area 3, there is a single-flow flow through the second heat transfer area 3.

The first fluid flows from the valve unit 5 into the second heat transfer area 3 at the fluid outlet 30 and exits the second heat transfer area 3 at the opposite end, not shown, as shown in FIG. 3.

Instead of a single-flow flow through the second heat transfer area 3, there could also be an example with a three-flow flow or an odd-numbered flow through the second heat transfer area 3, so that the first fluid leaves the second heat transfer area 3 at the opposite end, not shown, as shown in FIG. 3.

All other details are essentially the same as the example of FIGS. 6 and 7, so reference is made to the description.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A heat exchanger of a refrigerant circuit, the heat exchanger comprising:

a first heat transfer area having a first fluid path for a first fluid to flow through and a second fluid path for a second fluid to flow through, the first fluid path being in thermal contact with the second fluid path for heat transfer between the first fluid and the second fluid;

a second heat transfer area having a third fluid path for the first fluid to flow through and a fourth fluid path for the second fluid to flow through, the third fluid path being in thermal contact with the fourth fluid path for heat transfer between the first fluid and the second fluid;

a fluid collector having at least one first fluid inlet and at least one first fluid outlet for the inflow of the first fluid into the fluid collector for storage of the first fluid in the fluid collector and for outflow of the first fluid from the fluid collector; and a valve unit to control the fluid flow of the first heat transfer area, the second heat transfer area, and the fluid collector in at least one first operating state for air conditioning cycle operation and/or at least one second operating state for heat pump circuit operation, wherein, the second heat transfer area is a sub-cooling area, wherein the second heat transfer area and the fluid collector are controllable independently of the first heat transfer area via the valve unit, wherein the valve unit, in the at least one first operating state, connects the first fluid path of the first heat transfer area with the at least one first fluid inlet of the fluid collector and connects the at least one first fluid outlet of the fluid collector with the third fluid path, wherein the valve unit has a second fluid inlet for the inflow of the first fluid into a fifth fluid path of the valve unit and the valve unit has a second fluid outlet for the outflow of the first fluid from the fifth fluid path of the valve unit, wherein the valve unit, in the at least one first operating state, connects the second fluid inlet and the second fluid outlet with the first fluid path of the first heat transfer area via the fifth fluid path, wherein the valve unit has a third fluid inlet for the inflow of the first fluid into a sixth fluid path of the valve unit and the valve unit has a third fluid outlet for the outflow of the first fluid from the sixth fluid path of the valve unit, and wherein, in the at least one first operating state, the first fluid path of the first heat transfer area is connected to the third fluid inlet of the valve unit and the valve unit connects the sixth fluid path to the at least one first fluid inlet of the fluid collector via the third fluid outlet.

2. The heat exchanger according to claim 1, wherein the valve unit has a fourth fluid inlet for the inflow of the first fluid into a seventh fluid path of the valve unit and the valve unit has a fourth fluid outlet for the outflow of the first fluid from the seventh fluid path of the valve unit.

3. The heat exchanger according to claim 2, wherein, in the at least one first operating state, the third fluid path of the second heat transfer area is connected to the fourth fluid outlet of the valve unit and the valve unit connects the fluid collector and the seventh fluid path to the third fluid path of the second heat transfer area via the fourth fluid inlet.

4. The heat exchanger according to claim 3, wherein the valve unit has a fifth fluid inlet for the inflow of the first fluid into an eighth fluid path of the valve unit and the valve unit has a fifth fluid outlet for the outflow of the first fluid from the eighth fluid path of the valve unit.

5. The heat exchanger according to claim 4, wherein, in the at least one first operating state, the third fluid path of the second heat transfer area is connected to the fifth fluid inlet of the valve unit and the valve unit connects the third fluid path of the second heat transfer area to the fifth fluid outlet of the valve unit, via the eighth fluid path, for the outflow of the first fluid from the heat exchanger.

6. The heat exchanger according to claim 1, wherein the valve unit, in the at least one second operating state, connects the at least one first fluid outlet of the fluid collector with the third fluid path of the second heat transfer area and the third fluid path of the second heat transfer area with the first fluid path of the first heat transfer area.

7. The heat exchanger according to claim 1, wherein, in the at least one second operating state, the valve unit connects the second fluid inlet with the at least one first fluid inlet of the fluid collector.

8. The heat exchanger according to claim 2, wherein, in at least one second operating state, the third fluid path of the second heat transfer area is connected to the fourth fluid outlet of the valve unit and the valve unit connects the fluid collector and the seventh fluid path to the third fluid path of the second heat transfer area via the fourth fluid inlet.

9. The heat exchanger according to claim 1, wherein the valve unit connects the third fluid path of the second heat transfer area with the first fluid outlet of the fluid collector via a fluid inlet, a fluid channel and a fluid outlet.

10. The heat exchanger according to claim 1, wherein the first heat transfer area is arranged above or below the second heat transfer area.

11. The heat exchanger according to claim 1, wherein the first fluid path of the first heat transfer area is flowed through by the first fluid from bottom to top or from top to bottom and/or wherein the third fluid path of the second heat transfer area is flowed through by the first fluid from bottom to top or from top to bottom.

12. The heat exchanger according to claim 1, wherein the first heat transfer area is flowed through by the first fluid in a single-flow manner and/or wherein the second heat transfer area is flowed through by the first fluid in a single-flow manner.

13. The heat exchanger according to claim 1, wherein the first heat transfer area, the second heat transfer area, the fluid collector, and the valve unit are formed as a single unit.

14. The heat exchanger according to claim 1, wherein the first heat transfer area is flowed through by the first fluid in a multi-flow manner and/or wherein the second heat transfer area is flowed through by the first fluid in a multi-flow manner.

15. A heat exchanger comprising:

a first heat transfer area having a first fluid path for a first fluid to flow through and a second fluid path for a second fluid to flow through, the first fluid path being in thermal contact with the second fluid path for heat transfer between the first fluid and the second fluid;

a second heat transfer area having a third fluid path for the first fluid to flow through and a fourth fluid path for the second fluid to flow through, the third fluid path being in thermal contact with the fourth fluid path for heat transfer between the first fluid and the second fluid;

a fluid collector having at least one first fluid inlet and at least one first fluid outlet for the inflow of the first fluid into the fluid collector for storage of the first fluid in the fluid collector and for outflow of the first fluid from the fluid collector; and a valve unit to control the fluid flow of the first heat transfer area, the second heat transfer area, and the fluid collector in at least one first operating state for air conditioning cycle operation and at least one second operating state for heat pump circuit operation, wherein, in the at least one second operating state for heat pump circuit operation, the first fluid first flows through the fluid collector, then the first fluid flows through the valve unit, the valve unit directs the first fluid to flow through the second heat transfer area, and then the valve unit directs the first fluid to flow from the second heat transfer area to the first heat transfer area, such that in the at least one second operating state, the fluid collector is upstream of both of the second heat transfer area and the first heat transfer area, and the second heat transfer area is upstream of the first heat transfer area.

* * * * *